United States Patent [19]
Takeda et al.

[11] 3,892,584

[45] July 1, 1975

[54] MONOLITHIC REFRACTORY MATERIALS

[75] Inventors: Kenzo Takeda; Kazuhiko Takahashi; Kunihiko Shiraishi, all of Osaka, Japan

[73] Assignee: Nippon Crucible Co., Ltd., Tokyo, Japan

[22] Filed: May 18, 1973

[21] Appl. No.: 361,724

[30] Foreign Application Priority Data
May 19, 1972  Japan.............................. 47-49198

[52] U.S. Cl. ...................... 106/56; 106/44; 106/65
[51] Int. Cl.. C04b 35/10; C04b 35/52; C04b 35/56
[58] Field of Search........................... 106/44, 56, 65

[56] References Cited
UNITED STATES PATENTS

| | | | |
|---|---|---|---|
| 2,104,841 | 1/1938 | White | 106/44 |
| 2,388,080 | 10/1945 | Riddle | 106/44 |
| 2,431,327 | 11/1947 | Geiger | 106/44 |
| 3,329,514 | 7/1967 | Saunders et al. | 106/44 |
| 3,753,744 | 8/1973 | Komaru et al. | 106/44 |

*Primary Examiner*—J. Poer
*Attorney, Agent, or Firm*—Sughrue, Rothwell, Mion, Zinn & Macpeak

[57] ABSTRACT

Monolithic refractory materials comprising 55–75 percent by weight of alumina, 10–30 percent by weight of silicon carbide and 5–20 percent by weight of carbon. A chemical binder in an amount of 5–12 percent of the total combined weight of the mixtures of alumina, silicon carbide and carbon is present. The refractory materials have excellent erosion resistance against molten metals and slag.

9 Claims, 1 Drawing Figure

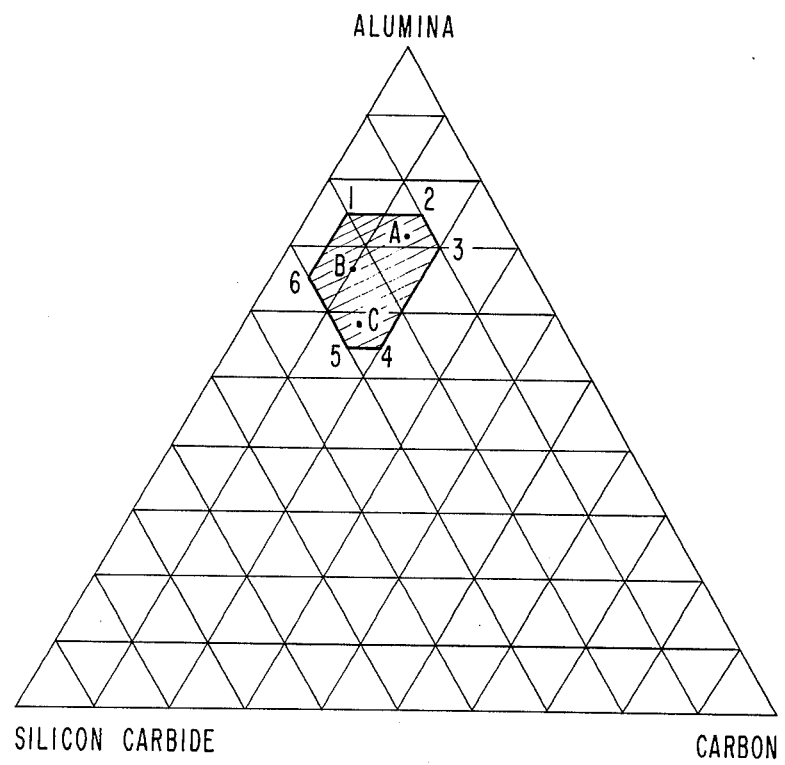

MONOLITHIC REFRACTORY MATERIALS

BACKGROUND OF THE INVENTION

1. Field of the Invention

This invention relates to monolithic refractory materials of excellent erosion resistance against molten metal and slag which can be used, for example, as linings of runners or troughs in blast furnaces for transferring molten metal slag and the like.

2. Description of the Prior Art

The lining of runners in blast furnaces and the like have hitherto been formed of refractory materials such as mixtures consisting of fine particles of chamotte, silica sand or the like, clay powder (as a binder), graphite (as a carbon source for improving the erosion resistance against molten pig iron) and water, by applying the mixtures to the runner etc., by means of a stamping or ramming operation.

At present, mixtures of chamotte particles and, as a binder, carbonaceous materials such as tar, etc. have also been utilized for the ramming operation to provide refractory linings.

At present, however, the pressure at the top of blast furnaces has become higher with the use of larger blast furnaces and with the development of modern furnace operating techniques. Further, the amount of pig iron produced in one furnace cycle has increased, the speed of transferring the pig iron has become greater and the temperature of the pig iron has become higher. In addition, in the method of tapping pig iron and slag at the same time, which has recently been employed in this field, the refractory lining materials of the runner for transferring molten iron are exposed to chemical and mechanical attack due to the pig iron and slag. The repair of the eroded parts must be done at high temperatures in front of the blast furnace, which is accompanied by substantial difficulties. Accordingly, the lining of a runner for transferring pig iron must have high erosion resistance to pig iron and slag, as well as being amenable to easy processing.

SUMMARY OF THE INVENTION

The object of this invention is to improve the erosion resistance of monolithic refractory materials to molten metal and slag as well as to increase the ease of processing the same.

The monolithic refractory materials of this invention therefore consist of 55–75 percent by weight of alumina, 10–30 percent by weight of silicon carbide and 5–20 percent by weight of carbon. A chemical binder in an amount of 5–12 percent of the combined weight of the mixtures of alumina, silicon carbide and carbon is present. The refractory materials have excellent erosion resistance against molten iron and slag.

BRIEF EXPLANATION OF DRAWING

The drawing is a ternary diagram of the alumina, silicon carbide and carbon system which constitutes the raw refractory materials of the present invention.

DETAILED DESCRIPTION OF THE INVENTION

As a result of studies on the phenomena of the erosion of refractory materials under attack by molten metals and slag, the inventors discovered that the erosion of relatively large sized particles in compositions of refractory materials due to molten metals and slag is relatively slow since large sized particles have a small specific surface areas, whereas the erosion of small sized particles and the refractory matrix, which bonds the coarse particles to each other, is relatively rapid, whereupon the coarse particles, though not eroded, are gradually was had out, from the surface of the relatively rapidly eroding matrix.

Therefore, this invention is based on the discovery that an increase in the erosion resistance of the refractory matrix and a decrease of the surface area of the refractory matrix improve the erosion resistance of the refractory material as a whole. In addition, this invention is also based upon the further discovery that the selection of an appropriate binder improves ease of the processing the resulting refractory.

The objects of using the respective raw materials of the present invention and the amounts thereof will now be explained.

The alumina used in the present invention is preferably fused alumina, a sintered alumina or a mixture thereof having a 94 percent by weight or greater alumina content. Alumina of high purity has various favorable merits e.g., high refractory properties, a high softening temperature under load, a high mechanical strength, a high erosion resistance against molten metals and various kinds of slag. In the present invention, an alumina where 75 percent or more of the alumina is coarse particles having the particle size of 1.5 mm. or greater is used. The amount of the alumina used is 55–75 percent. If the amount of the alumina is less than 55 percent, the erosion resistance and the refractory property of the refractory products tend to be lower, while if the amount is more than 75 percent, the strength of the refractory products is also poor. Fused alumina is prefered in that fused alumina particles have a fairly rugged surface and can be entangled with the refractory matrix to impart high mechanical strength to the refractory products. On the other hand, sintered alumina is also preferable in that particles thereof having fine pores or voids impart high mechanical strength to the refractory products since the refractory matrix penetrates into the pores thereof.

The silicon carbide used in the present invention has various merits such as high erosion resistance against various kinds of slag, high thermal conductivity and a low thermal expansion. The silicon carbide serves to fill the voids of the alumina particles to form a refractory matrix, and therefore the particle size diameter of the silicon carbide is preferably 3.4 mm. or less. In particular, it is necessary that 60 percent or more of the silicon carbide be fine particle having a particle size of 0.15 mm. or less. The amount of silicon carbide used is suitably 10–30 percent, and an excess over this range is not prefered since the ability to process the same and the erosion resistance are reduced.

As the raw material containing carbon, natural graphite and amorphous carbon which is solid at ordinary temperatures and contains volatile matter, such as pitch, are employed together, or the natural graphite and amorphous carbon can be used singly. The raw material containing carbon is advantageous since it is eroded and wetted by molten metals and slag only with difficulty.

The natural graphite used may be any one which is generally used as a component for forming refractory materials and may have any shape, e.g., as flakes, veins, etc., so long as the ash content thereof does not exceed 25 percent. However, too large sized particles of carbon are not suitable since they have poor dispersibility. In short, pulverized carbon particles having a particle size of 0.3 mm. or less are prefered.

The amorphous carbon containing volatile matter, such as pitch, becomes liquid after being heated, and penetrates into the voids or pores of the particles of the other components to adhere thereto, and with a further elevation of the heating temperature the carbon releases the volatile matter to solidify and form a carbon bond. The amorphous carbon is used in the form of pulverized particles having a particle size of 0.5 mm. or less so as to improve the dispersion upon mixing the raw materials.

The total amount of carbon component consisting of graphite and/or amorphous carbon is preferably 5–20 percent. If the amount is less than 5 percent, the resulting refractory materials have poor erosion resistance against molten metals and slag, and in addition low wettability by molten metals and slag cannot be attained. On the other hand, if the amount exceeds 20 percent, the strength of the resulting refractory materials is decreased, which is unfavorable.

With reference to the drawing attached hereto, to fully achieve all objects of the present invention, the proportion of the three ingredients of alumina, silicon carbide and carbon as a mixture of particles of raw materials must lie within the hatched zone surrounded by the following Points 1 through 6:

Point 1 (Alumina 75%; Silicon carbide 20%; Carbon 5%)
Point 2 (Alumina 75%; Silicon carbide 10%; Carbon 15%)
Point 3 (Alumina 70%; Silicon carbide 10%; Carbon 20%)
Point 4 (Alumina 55%; Silicon carbide 25%; Carbon 20%)
Point 5 (Alumina 55%; Silicon carbide 30%; Carbon 15%)
Point 6 (Alumina 65%; Silicon carbide 30%; Carbon 5%)

A chemical binder is added to the above described mixture of particles and they are mixed and processed.

As the chemical binder a sol is used having a solids content of more than 5 percent by weight such as a silica sol, alumina sol, mullite sol, etc.

As the binder in this kind of refractory material heretofore there has generally been used a mixture of a ceramic binder such as clay or the like and water. However, such a conventional binder often contracts during drying to cause cracks in the refractory products, and the erosion due to attacks by slag, etc., rapidly proceeds from the cracks. In addition, the ceramic binder is further defective in that a hard layer is formed on the surface layer of the resulting refractory products due to the viscosity of the clay in the course of stamping the refractory compositions, whereby the stamping pressure is absorbed by the hard surface layer formed and thus does not evenly reach the deep portions of the refractory composition.

On the contrary, the chemical binder of the present invention does not contract at drying and thus the refractory products have high erosion resistance. In addition, the use of such a chemical binder is extremely advantageous for the formation of a refractory layer of large size. The chemical binder in the form of a sol does not lose its liquidity in the stamping processing of the composition containing the binder, and, therefore, the stamping pressure is evenly transmitted even into the deep portion of the refractory composition. Further, the sol chemical binder is thixotropic in nature, and when an external vibrating force is applied to the mixture containing the chemical binder, the mixture is softened and shows fluidity. Consequently, so-called vibration casting or solid casting can easily be conducted according to the present invention.

The amount of the sol chemical binder used is necessarily 5–12 percent by weight on the basis of the above described powdery particle mixture. If the amount is less than 5 percent, the binding force is insufficient, while, on the contrary, if the amount exceeds 12 percent, the ability to process becomes the refractory composition worsened.

The present invention will now be explained in more detail by the following examples, which, however, do not limit the scope of the present invention.

EXAMPLE 1

Table 1 below shows the proportion, by weight, of the refractory materials used in the present invention.

Table 1

| Raw Materials | Particle size | Product A | Product B | Product C |
| --- | --- | --- | --- | --- |
| fused alumina | 1.5 mm or greater | 60% | 60% | — |
| fused alumina | less than 1.5 mm | 12% | 7% | — |
| sintered alumina | 1.5 mm or greater | — | — | 50% |
| sintered alumina | less than 1.5 mm | — | — | 8% |
| silicon carbide | 0.15 mm or greater | 4% | 7% | 10% |
| silicon carbide | less than 0.15 mm | 9% | 16% | 17% |
| natural graphite | 0.18 mm or less | 8% | 4% | 8% |
| pitch | 0.5 mm or less | 7% | 6% | 7% |
| (total of particle mixture | | (100%) | (100%) | (100%) |
| silica sol (solid content 20%) | | 7% | — | — |
| alumina sol (solid content 10%) | | — | 9% | — |
| mullite sol (solid content 12%) | | — | — | 8% |

The particle mixture composition of each of products A, B and C of the present invention corresponds to Points A, B and C, respectively, in the attached drawing.

Mixtures A, B and C in the Table 1 were individually well mixed, and then specimens were molded by stamping method. The specimens were put in a drying oven and the temperature was gradually elevated to 120°C to dry the specimens. The thus dried samples were fired in a reducing atmosphere at temperatures of 800°C and 1,450°C to give Products A, B and C respectively. The firing temperatures of 800°C and 1,450°C are based upon the following supposition: Regarding firing at 1,450°C, the temperature of the surface part of a refractory molding to be contacted with pig iron is taken into consideration; regarding the firing at 800°C, the temperature of the inner part of the refractory molding (about 100 mm from the surface to be contacted with pig iron) is taken into consideration.

As a conventional reference, a particle mixture of 58 percent by weight of hard-burned chamotte having a particle size of 5.7 mm or less, 20 percent by weight of natural graphite having a particle size of 0.15 mm or less and 22 percent by weight of Kibushi clay having a particle size of 0.7 mm or less was mixed with 11 percent by weight, on the basis of the mixture, of water, and the resulting mixture was molded, dried and fired to form a reference product according to the procedure described above.

The qualities of the formed products were compared with each other, the results being shown in Table 2.

of the Reference product. Thus, the products A, B and C of the present invention are superior to the Reference (conventional) product.

EXAMPLE 2

The powdery raw materials (particle mixture) and biners according to the mixing ratios shown in Table 1 of Example 1 were well mixed, and then the resulting mixtures were cast into a mold which was vibrated at 3,600 r.p.m. by means of a vibrator of 1.2 KW. Following the same procedures described in Example 1, the resulting molded samples were put in a drying oven, the temperature gradually elevated to 120°C, and the samples dried. Then, the dried samples thus obtained were fired a reducing atmosphere at temperatures of 800°C and 1,450°C. The measurement of the physical properties of the resulting products were products were conducted in the same manner as described in Example 1.

On the other hand, while the same procedures were attempted on the Reference product (conventional product), even when vibration was applied to the conventional product the fluidity did not appear and the desired formed products could not obtained.

The physical properties of the formed products of the present invention are shown in Table 3.

Table 2

|  |  | Product A | Product B | Product C | Reference product |
|---|---|---|---|---|---|
| Bulk density | 120°C | 2.63 | 2.68 | 2.53 | 1.95 |
|  | 800°C | 2.53 | 2.51 | 2.53 | 1.80 |
|  | 1450°C | 2.52 | 2.53 | 2.54 | 1.78 |
| Percentage of | 120°C | 0.04 | 0.09 | 0.15 | 0.80 |
| Linear | 800°C | 0.03 | 0.17 | 0.23 | 1.12 |
| shrinkage | 1450°C | 0.06 | 0.19 | 0.03 | 1.21 |
| Apparent | 800°C | 25.8 | 24.9 | 25.5 | 24.5 |
| porosity(%) | 1450°C | 26.1 | 24.6 | 25.5 | 22.3 |
| Compressive | 800°C | 200 | 183 | 220 | 200 |
| strength (kg/cm$^2$) | 1450°C | 208 | 210 | 247 | 220 |
| Erosion resistance | pig iron | 0.20 | 0.21 | 0.27 | 1.0 |
| *(comparison data | slag | 0.31 | 0.23 | 0.21 | 1.0 |

The erosion amount of each of products A, B and C of the present invention is shown on the basis of the erosion amount of the Reference product being 1.0.

The smaller the number, the higher the erosion resistance.

The bulk density and the percentage of linear shrinkage were calculated on the basis of the size of each specimen after the molding thereof, and the porosity and the compressive strength were determined according to conventional testing methods.

The measurement of erosion resistance was carried out as follows: a plurality of refractory rod specimens having a trapezoidal cross section were applied to the inner side wall of an inclined rotary tube furnace so that the inner face was formed as a polygonal tube. Metal or slag was charged in the rotating furnace, and an oxygen-propane flame was injected thereto to melt the metal or slag. After a predetermined period of time, the amount of erosion on the inner face of the polygonal tube was measured. The metal and slag used were blast furnace pig iron and blast furnace slag having a basicity of about 1.2, respectively. As seen in Table 2, the percentage of linear shrinkage of Products A, B and C of the present invention is about one-fifth to one-tenth of the Reference product, and the erosion resistance of Products A, B and C was about 3–4 times that Table 3

|  |  | Product A | Product B | Product C |
|---|---|---|---|---|
| Bulk density | 120°C | 3.03 | 3.10 | 3.02 |
|  | 800°C | 2.70 | 2.75 | 2.70 |
|  | 1450°C | 2.67 | 2.71 | 2.65 |
| Percentage of | 120°C | 0.04 | 0.09 | 0.11 |
| linear | 800°C | 0.03 | 0.15 | 0.14 |
| shrinkage | 1450°C | 0.07 | 0.17 | 0.09 |
| Apparent | 800°C | 23.0 | 22.8 | 24.2 |
| porosity (%) | 1450°C | 22.3 | 22.1 | 23.8 |
| Compressive | 800°C | 210 | 200 | 234 |
| strength (kg/cm$^2$) | 1450°C | 222 | 230 | 255 |

It is apparent from a comparison of Table 2 with Table 3, the "vibrated" products of the present invention have a higher bulk density and a lower porosity as compared with the stamped formed products of the present invention. Accordingly, we can say that the monolithic refractory materials of the present invention are quite suitable for vibration formation.

From the results of using Product A in the main trough of a blast furnace, the erosion reached a 4.2 mm depth in the lining refractory per 1,000 tons of transferred pig iron. On the other hand, the erosion with a conventional product reached about a 15 mm depth per 1,000 tons of transferred pig iron. Thus, the erosion resistance Product A is 3.5 times as high as that of the conventional product.

As a result of using Product B in the main trough of a blast furnace, the erosion reached a 4.5 mm depth, and thus, the erosion resistance thereof is about 3.3 times as high as that of the above described conventional product.

While the invention has been described in detail and with reference to specific embodiments thereof, it will be apparent to one skilled in the art that various changes and modifications can be made therein without departing from the spirit and scope thereof.

What is claimed is:

1. Refractory materials for ramming and solid casting consisting essentially of 55–75 percent of an alumina material; 10–30 percent of silicon carbide and 5–20 percent of carbon, based on the total 100 wt percent, and 5–12 percent, based on the total weight of said alumina material, silicon carbide and carbon, of a chemical binder of a sol having a solids content of more than 5 percent by weight selected from the group consisting of a silica sol, an alumina sol and a mullite sol.

2. Refractory materials as claimed in claim 1 wherein said alumina material is a fused or sintered alumina having a 94 percent by weight or greater alumina content.

3. Refractory materials as claimed in claim 1 wherein 75 wt percent or more of said alumina material is particles having a particle size of 1.5 mm or greater.

4. Refractory materials as claimed in claim 1 wherein said silicon carbide is particles having a particle size of 3.4 mm or less and 60 percent by weight or more of said silicon carbide is particles having a particle size of 0.15 mm or less.

5. Refractory materials as claimed in claim 1 wherein said carbon consists of natural graphite and/or amorphous carbon.

6. Refractory materials as claimed in claim 5 wherein the natural graphite has an ash content of 25 percent or less.

7. Refractory materials as claimed in claim 6 wherein said natural graphite is particles and has a particle size of 0.3 mm or less.

8. Refractory materials as claimed in claim 5 wherein said amorphous carbon is particles and has a particle size of 0.5 mm or less.

9. A process for casting a refractory material usable for ramming and solid casting, which comprises casting a thixotropic composition of a refractory material consisting essentially of:

55–75 percent of an alumina material; 10–30 percent of silicon carbide and 5–20 percent of carbon based on the total 100 wt percent, and 5–12 percent based on the total weight of said alumina material, silicon carbide and carbon, of a chemical binder of a sol having a solids content of more than 5 percent by weight selected from the group consisting of a silica sol, an alumina sol and a mullite sol, while applying vibrations thereto, whereby said composition, which is thixotropic, softens and becomes more fluid.

* * * * *